United States Patent
Rühl

(10) Patent No.: US 6,411,893 B2
(45) Date of Patent: Jun. 25, 2002

(54) METHOD FOR SELECTING A LOCALITY NAME IN A NAVIGATION SYSTEM BY VOICE INPUT

(75) Inventor: Hans-Wilhelm Rühl, Solms (DE)

(73) Assignee: Siemens AG (DE)

( * ) Notice: Subject to any disclaimer, the term of this patent is extended or adjusted under 35 U.S.C. 154(b) by 0 days.

(21) Appl. No.: 09/898,819

(22) Filed: Jul. 3, 2001

(30) Foreign Application Priority Data

Jul. 28, 2000 (DE) .......................... 100 36 851

(51) Int. Cl.$^7$ ................ G08G 1/0968; G01C 21/36
(52) U.S. Cl. ................ 701/207; 701/201; 701/211; 704/246; 379/88.01
(58) Field of Search ................ 701/207, 201, 701/209, 210, 211; 704/231, 246, 251, 250, 255, 265, 275, 276, 243; 379/88.01, 88.03, 88.04; 455/456, 457; 340/990, 995

(56) References Cited

U.S. PATENT DOCUMENTS 5,825,306 A * 10/1998 Hiyokawa et al. .......... 340/988
6,112,174 A * 8/2000 Wakisaka et al. ........... 701/117

FOREIGN PATENT DOCUMENTS

| DE | 19533541 C1 | 3/1997 |
| DE | 19709518 C1 | 3/1998 |
| DE | 19742054 A1 | 4/1999 |
| DE | 19810173 A1 | 10/1999 |
| DE | 19907759 A1 | 8/2000 |
| WO | WO98/27531 | 6/1998 |

* cited by examiner

Primary Examiner—Tan Nguyen
(74) Attorney, Agent, or Firm—Mayer, Brown, Rowe & Maw

(57) ABSTRACT

Disclosed is a method for selecting a locality name in a motor vehicle navigation system by voice input by means of a speaker-independent voice input system. A first list contains all locality names. In a second list, the locality names are entered which have already been entered once into the system, the phonemes being additionally entered. In the case of a repeated voice input of a locality name, the search is first performed in the second list.

18 Claims, 2 Drawing Sheets

METHOD FOR SELECTING A LOCALITY NAME IN A NAVIGATION SYSTEM BY VOICE INPUT

BACKGROUND OF THE INVENTION

1. Field of the Invention

The invention relates to a method for selecting a locality name in a motor vehicle navigation system by voice input. Furthermore, the invention relates to a navigation system comprising a voice input system for converting spoken words into features or, respectively, a sequence of features, a non-volatile storage element as a first data .source which contains a list with locality names, a second data source which contains some of the data of the first data source, a control unit for selecting a locality name on the basis of the sequence of features supplied by the voice input system.

2. Background of the Invention

Navigation systems for motor vehicles have been known for a relatively long time and are increasingly offered in new vehicles or for retrofitting. Such navigation systems contain a storage medium containing the road map data of one or more countries. Before starting a voyage, the user can have a route calculated to his destination and then allow the navigation system to guide him to the selected destination. In the navigation systems currently offered, the destination is entered manually, as a rule. In addition, however, navigation systems are also already known in which a destination is selected by voice input. The problem with this arrangement is, however, that several 10 000 town names and several 1,000 street names must be considered as locality names for the destination input in a navigation system, depending on the size of the geographic area stored in the storage medium. Known voice recognition devices, in contrast, are designed for recognizing much fewer words, for example about 1,000. In addition, searching in such a large database takes a correspondingly long time.

From DE 197 42 054 A1, an input system for town and/or street names is known which contains a data source which contains, apart from a first town and/or street list containing alphabetically sorted town and/or street names, at least one second town and/or street list with town and/or street names sorted in accordance with a frequency criterion. The frequency criterion selected is, in particular, the number of inhabitants of a town or the number of inhabitants living in a street. The search for a locality name which has been input is initially performed in the second list and is only performed in the first complete list if the town which has been input has not been found in the second list. As a result, large cities, for example, given as destinations are very rapidly found. The locality names can be input via a voice input system which, however, is not described in greater detail.

From DE 197 09 518 C1, a method and a device for inputting a destination address by voice into a navigation system in real-time mode is known. The voice recognition system exhibits both a speaker-independent voice recognizer and a speaker-dependent voice recognizer, the speaker-independent voice recognizer operating on the basis of phonemes. To ensure that voice can be recognized in real time, the address data are allocated to various lexicons. Such a lexicon then always represents a subset of all stored address data and has a maximum of 1,500 entries. A basic lexicon is provided which has approximately 1,000 entries of the towns having more than 10,000 inhabitants. In addition, lexicons for individual regions or surrounding areas are provided. However, this method is very costly due to the multiplicity of lexicons and the requirement for performing two passes in the voice recognition system. In addition, the data must already be correspondingly edited and allocated to various lexicons.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

It is an object of the invention to specify a method for selecting a locality name in a motor vehicle navigation system with voice input which allows a fast selection of localities by voice input of the locality names already previously selected by a user. It is a further object of the invention to develop a generic navigation system in such a manner that it is suitable for carrying out this method.

In brief, an embodiment of the invention is a method for selecting a locality name in a motor vehicle navigation system in which said system contains a first and a second list with locality names, wherein said second list comprises a subset of the locality names contained in the first list together with the phonemes of said locality names, comprising:

vocally inputting a desired locality name via a voice input system;

determining features of the vocally input desired locality name;

comparing the features of the vocally input desired locality name with features of the stored phonemes of the locality names in the second list; and selecting a locality name if the features of the vocally input desired locality name sufficiently correspond to the features of the phonemes of a locality name in the second list; or if the features of the vocally input desired locality name do not sufficiently correspond to the features of the phonemes of a locality name in the second list, requesting a further input of the desired locality name in a second form of input differing from the voice input of the desired locality name;

selecting a locality name from the first list by means of the second form of input; and storing the selected locality name and the phonemes of the vocally input desired locality name in the second list.

The comparison between the features of the spoken locality name and the features of the stored phonemes is performed with the aid of known methods for pattern comparison.

The method according to the invention uses a speaker-independent voice input system so that no special training for voice recognition is required. All locality names which are available in the associated storage element are stored in a first list. In this connection, a locality name is understood to be both town names and street names. If necessary, the first list can be divided into two part-lists, namely one for the town names and one for street names. In the second list, only those locality names are entered which have already been entered into the system by voice input by a user. In this second list, both the locality name in written form and a stylized form of the spoken locality name in the form of phonemes are stored for this purpose. If then a repeated voice input of a locality name takes place via the voice input unit, features or, respectively, a sequence of features of the spoken locality name are first determined in a manner known per se. Then these features of the spoken locality name are compared with the features of the phonemes of locality names stored in the second list. If sufficient correspondence to a stored locality name is found, this locality name is selected. Due to a relatively small number of locality names in the second list, this selection is carried out in real time.

If it has not been possible to find in the second list the locality name which has been input, the user is requested to input the locality name in a second form of input. This second form of input can be, for example, the manual input of the locality name or a voice input in the form of numbers or letters. In the latter case, the user spells the locality name, for example, or he inputs the telephone dialing code or zip code of the town to be found. The locality name is selected from the first complete list by using this second input form. The selected locality name is then stored, together with the phonemes of the locality name previously spoken, in the second list so that it can be found in the case of a repeated voice input of this locality name. The locality names of the first list can be associated with data records which contain, for example, more detailed information on this town. In a special embodiment, it is provided that the data records which are associated with a locality name of the first list, after a locality name has been selected from the first list by means of the second form of output are stored, together with the selected locality name, in the second list. Thus, the information of these data records is also immediately available in the case of a repeated selection of this town by voice input.

The locality names can be sorted in different ways, especially in the second list. On the one hand, the locality names can be stored alphabetically. On the other hand, however, the navigation system can be adapted better to the habits of the respective user if the frequency of input of a locality name is additionally recorded. In this case, the locality names of the second list can be sorted in accordance with the frequency in which they have been input. The advantage of this is that the locality name which is selected most frequently by the respective user is at the top in the second list. It will thus also be found most rapidly in the case of a repeated input. This results in a particularly short response time of the system for the towns frequently input and thus also driven to by the user.

In a further embodiment of the invention, it is provided that the locality names of the second list are stored in the order in which they have been input. As a result, the trip destinations last driven to are in each case at the top in the second list. Such a method is of advantage if individual destinations are driven to more frequently only in particular time intervals. In addition, combinations of the sorting criteria described above are also possible. Thus, for example, a weighted storage of the locality names in accordance with the frequency in which they have been input and the order in which they have been input is conceivable.

In brief, yet another embodiment of the invention is a navigation system for a motor vehicle comprising a voice input system for converting spoken words into a plurality of features; a first data source comprising a non-volatile storage element for storing data comprising a list with locality names; a second data source for storing some of the data of the first data source; and a control unit for selecting a locality name on the basis of the features supplied by the voice input system. Further embodiments are provided wherein the second data source comprises a rewritable non-volatile storage element for storing both locality names and phonemes of the locality names associated with the locality names, wherein said phonemes are generated by the voice input system on the basis of the spoken words.

The navigation system preferably has a manual input device for inputting locality names in a second form of input. This is of advantage, in particular, if the locality name cannot be identified by voice input.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

In the text which follows, the invention will be explained in greater detail with reference to exemplary embodiments and to the drawing, in which.

DETAILED DESCRIPTION OF THE PREFERRED EMBODIMENTS

Figure 1:
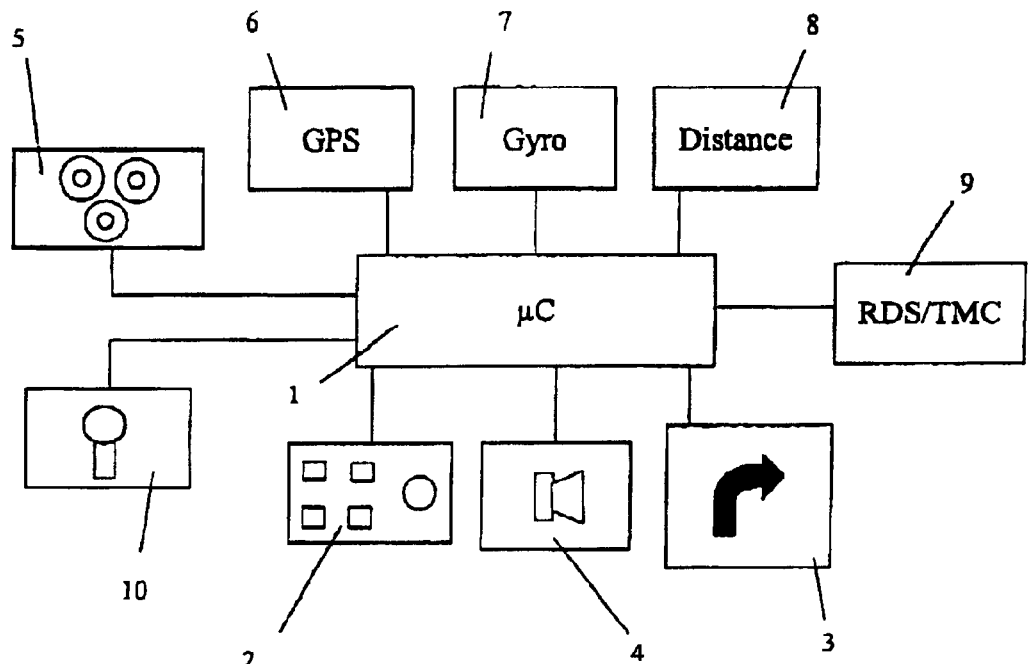
FIG. 1 is a schematic diagram of an embodiment of a first navigation system according to the present invention.

The method according to the invention can be used both in so-called on-board navigation systems and in so-called off-board navigation systems. FIG. 1 shows an embodiment of an on-board navigation system according to the present invention. The central component is the processing unit 1 which, together with the associated storage elements, forms the navigation computer. In the processing unit 1, various software modules are running. A manual input unit 2 and a sound input unit 10 are connected to the processing unit 1. The speaker-independent voice recognition system connected to the sound input unit 10 can run, for example, as a software module in the processing unit 1. Furthermore, a visual display unit 3 and a sound output unit 4, via which navigation information is output, are linked to the processing unit 1. The navigation system also contains a reader 5 for a storage medium not shown, especially a CD-ROM. On this CD-ROM, the road map data and a list with the locality names are stored. To determine the position of the vehicle, the navigation system also has a GPS receiver 6 for receiving satellite navigation signals and a direction sensor 7 and a distance sensor 8. The direction sensor 7 and the distance sensor 8 ensure that the position is determined even if the signals required for satellite navigation cannot be received or not in adequate quality. Furthermore, the central processing unit 1 is linked to a radio receiver 9 via which traffic messages are received and forwarded to the central processing unit 1 to be taken into consideration in planning the route. As already mentioned, the first complete list containing the locality names is stored on a CD-ROM in this embodiment. In contrast, the second list containing locality names is stored in a non-volatile and rewritable storage element which is directly associated with the processing unit 1. Generation of the phonemes on the basis of the voice input of a locality name is performed by a corresponding software module in the processing unit 1.

Figure 2:
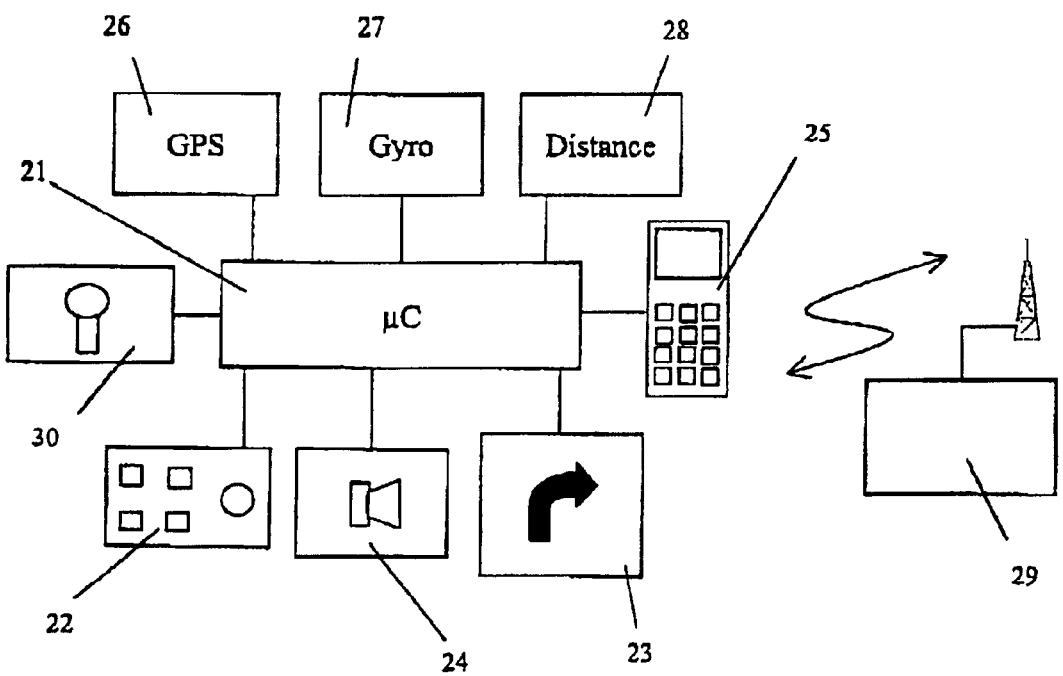
FIG. 2 is a schematic diagram of an embodiment of a second navigation system according to the present invention.

FIG. 2 shows an embodiment of an off-board navigation system according to the present invention. Here, too, the central component of the navigation system is a processing unit 21 with the associated storage elements. A manual input unit 2 and a voice input unit 30 are connected to the processing unit 21. Furthermore, a visual display unit 23 and a sound output unit 24 and, to determine the position, a GPS receiving unit 26, a direction sensor 27 and a distance sensor 28 are also connected to the processing unit 21 as in the system described above. In deviation from the on-board navigation system described in FIG. 1, the off-board navigation system does not contain road map data in the vehicle, however. Instead, the processing unit 21 is connected to a mobile telephone 25 in the example shown. The destination input via the input units 22 or 30 is transmitted via a mobile radio link to a central station 29 in which the road map data are stored. In this central station, the route is calculated and the navigation information is forwarded to the processing unit 21 for output via the visual display unit 23 and/or the sound output unit 24 via the radio link and the mobile radio telephone 25. In such an off-board navigation system, a locality name can also be selected in accordance with the method according to the invention. The first list containing the complete locality names is stored in the central station 29. The user inputs the desired locality name by voice via the voice input unit 30. As in the example described above, the voice recognition system is again integrated in the processing unit 21. Furthermore, the processing unit 21 has a non-volatile storage element which contains the second list with locality names and the associated phonemes.

Figure 3:
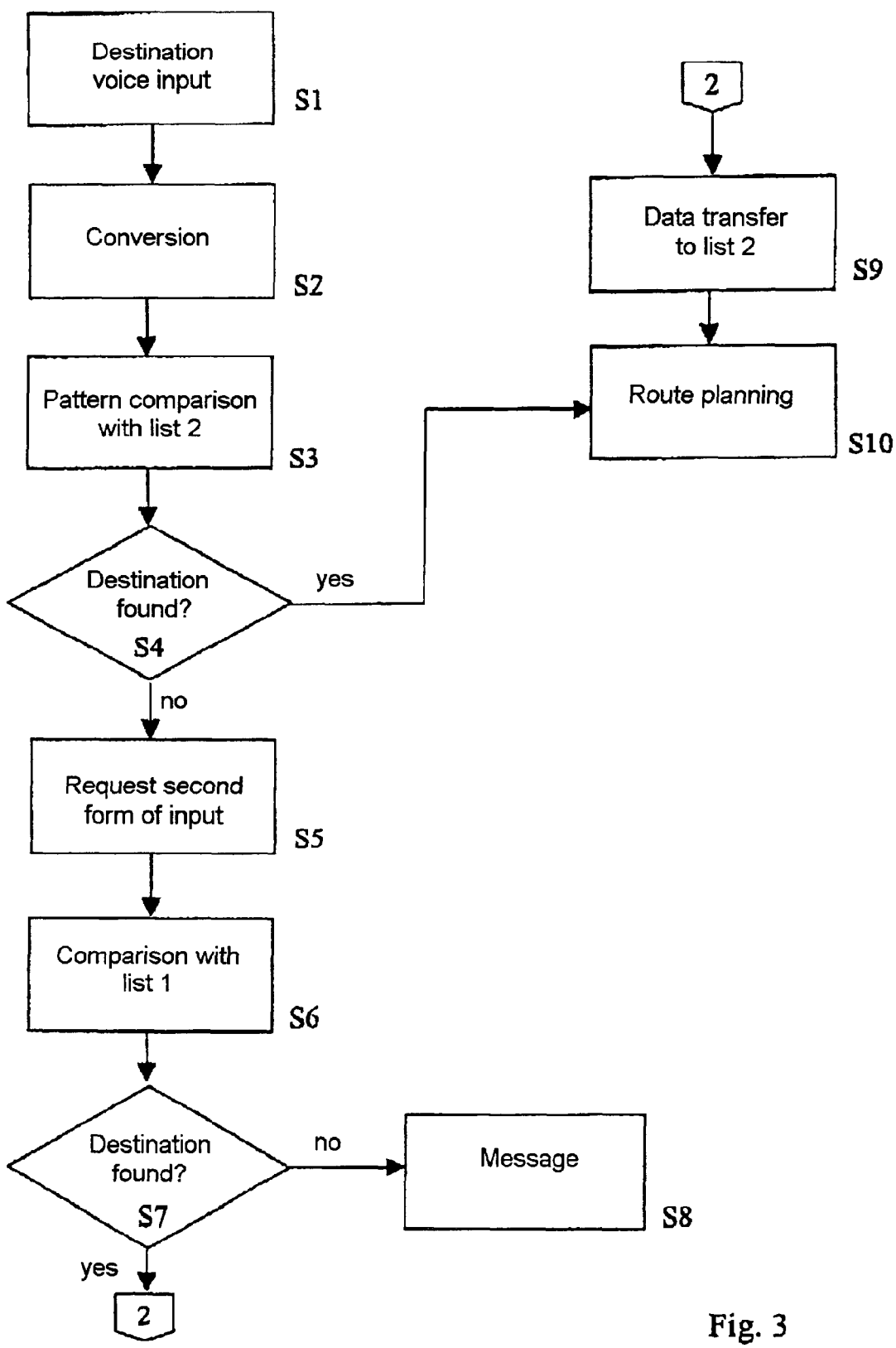
FIG. 3 shows a flow chart of an embodiment of a method according to the present invention.

In the text which follows, the method according to the invention will be explained in greater detail with reference to the flowchart in FIG. 3. In step S1, the user inputs his desired destination into the navigation system by voice via the voice input unit. In the processing unit, features of the sound signal are determined (step S2). In step S3, a comparison is performed between the features of the spoken destination with the features of the phonemes stored in the second list in a non-volatile storage element of the central processing unit. In step S4, a check is made whether there is a match and the destination has already been found. If this is so, the destination found can be directly used for the planning of the route in step S10. In the case of an on-board navigation system, route planning is done by a corresponding software module in the central processing unit whereas in the case of an off-board navigation system, the destination thus found is transmitted to the central station.

If, on the other hand, it was not possible to find the desired destination in the second list or could not be found with sufficient reliability, in step S4, the user is requested to input the destination in a second form of input in step S5. This can be, in particular, a manual input of the destination or the spelling of the destination. The destination which has been input is then compared with that in the first list, which is stored on the CD-ROM or in the central station, in step S6. In step S7, a check is made whether the destination has been found in the first list. If this is not so, a corresponding message is output to the user in step S8. If, in contrast, it has been possible to find the destination in the first list, the destination is then transferred into the second list, the phonemes of the destination also being transferred into this list at the same time so, in the case of a repeated voice input of the destination by the user, this destination can be found in the second list. Following this, the route is planned in S10.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A method for selecting a locality name in a motor vehicle navigation system in which said system contains a first and a second list with locality names, wherein said second list comprises a subset of the locality names contained in the first list together with the phonemes of said locality names, comprising:

vocally inputting a desired locality name via a voice input system;

determining features of the vocally input desired locality name;

comparing the features of the vocally input desired locality name with features of the stored phonemes of the locality names in the second list; and selecting a locality name if the features of the vocally input desired locality name sufficiently correspond to the features of the phonemes of a locality name in the second list; or if the features of the vocally input desired locality name do not sufficiently correspond to the features of the phonemes of a locality name in the second list, requesting a further input of the desired locality name in a second form of input differing from the voice input of the desired locality name;

selecting a locality name from the first list by means of the second form of input; and storing the selected locality name and the phonemes of the vocally input desired locality name in the second list.

2. The method as claimed in claim 1, wherein data records are allocated to the locality name of the first list, the selected locality name being stored together with the associated data record in the second list after a locality name has been selected from the first list by means of the second form of input.

3. The method as claimed in claim 1 wherein the second form of input is a manual input.

4. The method as claimed in claim 1 wherein the second form of input is a voice input of numbers or letters.

5. The method as claimed in claim 1 wherein the locality names are alphabetically stored.

6. The method as claimed in claim 1 wherein the frequency of input of a locality name is recorded.

7. The method as claimed in claim 1 wherein the locality names in the second list are sorted in accordance with the frequency in which they have been input.

8. The method as claimed in claim 1 wherein the locality names in the second list are stored in the order in which they have been input.

9. A navigation system for a motor vehicle comprising:

a voice input system for converting spoken words into a plurality of features;

a first data source comprising a non-volatile storage element for storing data comprising a list with locality names;

a second data source for storing some of the data of the first data source; and a control unit for selecting a locality name on the basis of the features supplied by the voice input system.

10. The navigation system as claimed in claim 9 wherein the second data source comprises a rewritable non-volatile storage element for storing both locality names and phonemes of the locality names associated with the locality names, wherein said phonemes are generated by the voice input system on the basis of the spoken words.

11. The navigation system as claimed claim 10 wherein the phonemes of the second data source are used as representatives of the spoken form of the locality names to be detected by the voice input system.

12. The navigation system as claimed in claim 9 further comprising a manual input device for inputting locality names in a second form of input.

13. The navigation system as claimed in claim 9 further comprising a means for determining the position of the vehicle, and means for outputting navigation information.

14. The navigation system as claimed claim 9 further comprising a storage element containing road network data.

15. The navigation system as claimed in claim 9 wherein the navigation system is connected to a mobile radio telephone.

16. The navigation system as claimed in claim 15, wherein the selected locality name can be transmitted to an external database for generating a trip via a mobile radio system.

17. The navigation system as claimed in claim 9 wherein the first data source is an external data source.

18. The navigation system as claimed in claim 9 wherein the second data source is an external data source.

* * * * *